(No Model.) 2 Sheets—Sheet 1.
S. F. ALLEN.
ANIMAL SHEARS.
No. 540,848. Patented June 11, 1895.
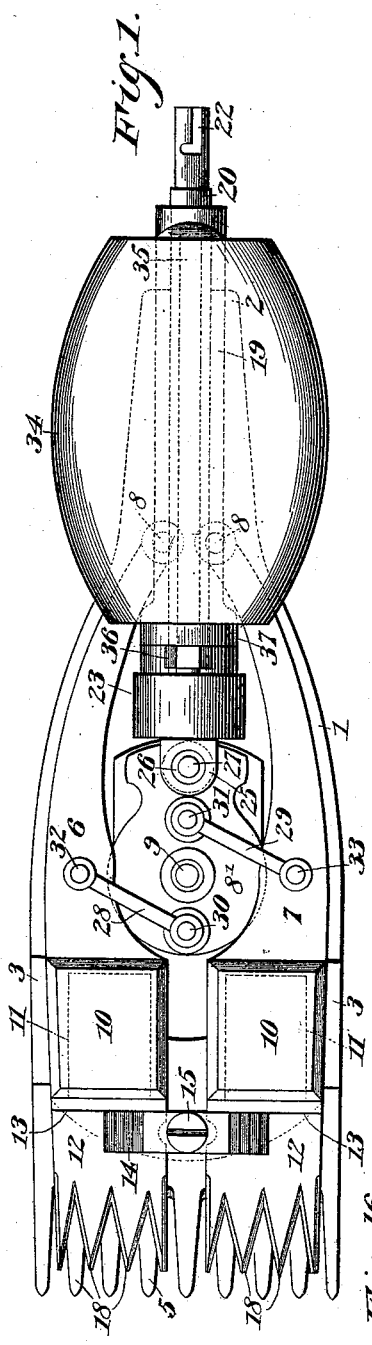
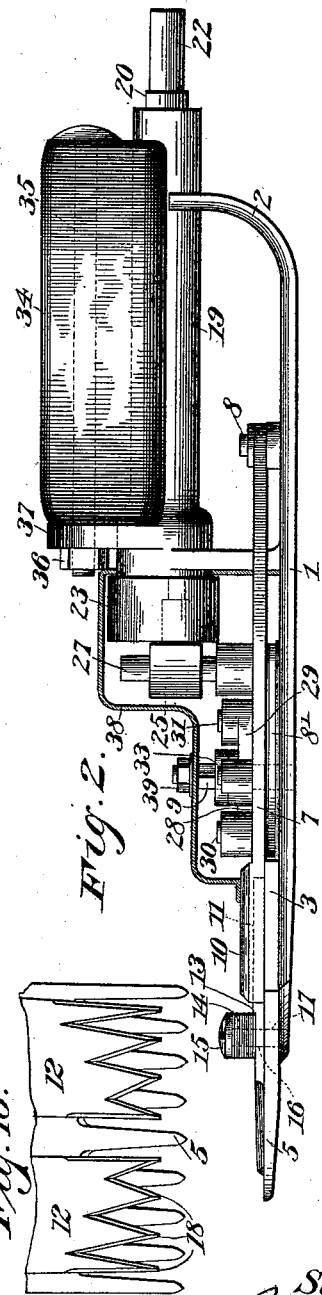
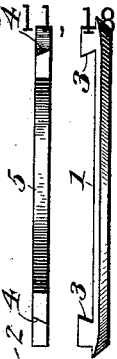
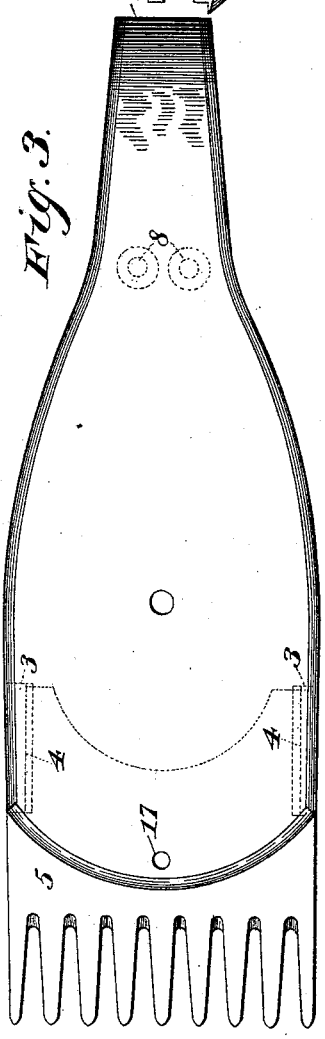
Witnesses:
J. M. Witherow
G. T. Myers
Inventor
Samuel F. Allen,
By Joseph L. Atkins
Attorney (No Model.) 2 Sheets—Sheet 2.
S. F. ALLEN.
ANIMAL SHEARS.
No. 540,848. Patented June 11, 1895.
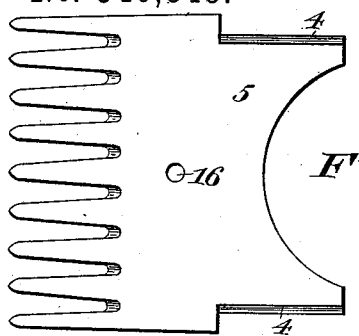
Fig. 5.
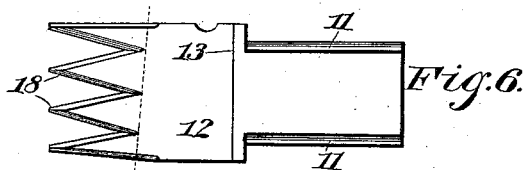
Fig. 6.
Fig. 8.
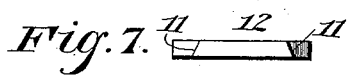
Fig. 7.
Fig. 9.
Fig. 10.
Fig. 11. Fig. 12.
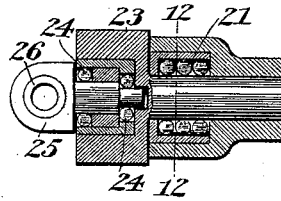
Fig. 13. Fig. 14.
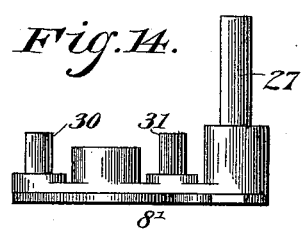
Fig. 15.
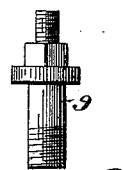
Witnesses:
J. M. Witherow
G. F. Myers
Inventor,
Samuel F. Allen,
By Joseph W. Atkins
Attorney

UNITED STATES PATENT OFFICE.

SAMUEL FENTON ALLEN, OF CHICAGO, ILLINOIS.

ANIMAL-SHEARS.

SPECIFICATION forming part of Letters Patent No. 540,848, dated June 11, 1895.

Application filed December 19, 1893. Serial No. 494,056. (No model.)

*To all whom it may concern:*

Be it known that I, SAMUEL FENTON ALLEN, of Chicago, county of Cook, State of Illinois, have invented certain new and useful Improvements in Animal-Shears, of which the following is a specification, reference being had to the accompanying drawings.

The object of my invention is to produce an improvement in animal shears by which the breadth of cut of the machine may be increased without interfering with the proper operation of the machine.

It also consists in certain constructions and arrangements of the parts as will hereinafter more fully appear in the specification and will be succinctly set forth in the appended claims.

In the accompanying drawings, Figure 1 is a top plan view of the machine with the cap removed. Fig. 2 is a side elevation of the same with the cap in cross-section. Fig. 3 is a bottom plan view of the frame and comb. Fig. 4 is an end view thereof. Fig. 5 is a plan view of the comb detached. Fig. 6 is a plan view of one of the blades detached. Fig. 7 is an end view thereof. Fig. 8 is a side elevation thereof. Fig. 9 is an end view of the vibrating arms detached. Fig. 10 is a view of the blade-retaining spring detached. Fig. 11 is a longitudinal view of the shaft partly in section. Fig. 12 is an end view of the shafthead. Fig. 13 is a central vertical section of Fig. 11 on a line 12 12. Fig. 14 is a side elevation of the vibrating disk detached. Fig. 15 is a side elevation of the vibrating-disk stud detached. Fig. 16 is a view of the blades and comb, illustrating the teeth defined by serrations of regularly-graduated depths, the graduation of the serrations being somewhat exaggerated.

Referring to the figures on the drawings, 1 indicates a frame made of suitable material and preferably of the shape illustrated, namely, having at one end an upwardly curved bracket support 2 and at the other end dovetail strips 3 into which a correspondingly shaped end 4 of a comb 5 is inserted and by which it is securely held.

6 and 7 indicate vibrating arms each pivotally secured to the frame 1 by a stud 8. Each of the vibrating arms is curved in its upper part, as illustrated, to accommodate a vibrator 8' pivoted by a stud bolt 9, preferably screwing into the frame 1. Extending beyond the vibrator toward the comb the vibrating arms terminate in dovetail ends 10 adapted to receive the correspondingly shaped ends 11 of cutter blades 12. By the vibration of the cutter blades across the comb, the machine is made to shear in the usual manner. Each blade is provided with a shoulder 13 on its upper surface which works against a spring 14 that is secured in place above the blades by a screw bolt 15, passing through an aperture 16 in the comb and screwing into a screw hole 17 in the frame 1. By means of the bolt 15 the comb is securely held in place upon the frame. The spring secured thereby above the blades, serves, by means of the shoulders 13, to prevent the separation of the blades from the vibrating arms, except when it is desired to remove them, when, by loosening the bolt 15, they may be readily withdrawn.

The object of employing a plurality of blades in the same cutter is to avoid that shock to the mechanism which is experienced when a machine, having an extensive cutting surface working in one direction, is thrust into material to be sheared.

By employing a plurality of separate cutting blades, I am able to time the movement of each separately, thereby equalizing, as it were, the force of the cutting blows, the stroke of one cutter in my machine counterbalancing that of the other. In order to reduce the possibility of a shock of this sort to a still greater degree, I make the serrations between the teeth 18 of the blades 12 of different, preferably regularly increasing, depths. By this means the cut of the machine is made gradual. For example, supposing the blade to be moving outwardly across the comb, the inside tooth of each cutter will have nearly finished its cut before the outside tooth has begun its cut. By the preferred arrangement, each intermediate tooth has regular intermediate graduations of cuts to perform. When the blade moves in the opposite direction, or inwardly, the operation is the same, except that it is reversed, as to the cutting sides.

19 indicates a barrel or support for the shaft 20. The shaft 20 is preferably carried on ball bearings 21 within the barrel and is adapted, at its outer end 22, to be connected with a flexible shaft. Not illustrated.

23 indicates a driving head secured to the shaft and carrying, preferably in ball bearings 24, a rotary eccentric 25. The eccentric is provided with a smooth bore 26 that surrounds a stud 27 which is firmly fixed, at its lower end, to the vibrator 8'.

By the rotation of the shaft 20 the driving head 23 is caused to revolve and to impart motion, through the eccentric and stud 27, to the vibrator 8'. The eccentric in its operation moves up and down upon the stud as the driving head revolves. The vibrator 8' is operatively connected with the vibrating arms 6 and 7, as by pitmen 28 and 29, pivotally secured to the vibrator, preferably on opposite sides of the central stud 9, as indicated at 30 and 31, respectively. The pitman 28 is pivoted, as indicated at 32, to the vibrating arm 6, and the pitman 29 is connected in like manner to the vibrating arm 7, as indicated at 33.

The machine is preferably provided with a handle 34 secured, as by a bolt 35, and nut 36, to a lug 37 through which the bolt passes. The driving mechanism is preferably covered by a cap 38 fitted over the parts and held in place by a nut 39 screwing upon the upper end of the vibrator stud 9 inserted through an aperture in the cap.

The operation of my machine is as follows: Rotation being imparted to the shaft 20, in the manner above suggested, the driving head is caused to revolve at a high rate of speed to impart movement to the vibrator. It in turn actuates the vibrating arms which drive the blades 12 backward and forward across the comb, the movements of the blades being in opposite directions, counterbalancing each other, as hereinbefore suggested.

I do not confine myself to the details of construction herein shown and described, but reserve the right to modify and vary them at will within the scope of my invention.

What I claim is—

1. In a shearing machine, the combination with a frame and comb, of a blade provided with teeth having their extremities in line with each other, said teeth being defined by serrations of varying depths regularly graduated from one side of the blade to the other, substantially as specified.

2. In a shearing machine, the combination with a frame and comb, of a plurality of oppositely moving blades provided, respectively, with teeth defined by serrations of regularly graduated depth, the extremities of the teeth upon both blades being in line and the serrations in the respective blades being graduated in opposite directions, substantially as specified.

3. In a shearing machine, the combination with a frame and comb, of a plurality of pivoted oscillatory vibrator arms, blades thereon, an oscillatory vibrator pivoted to the frame between the arms, an eccentric operatively connected to the vibrator and means for actuating the eccentric, substantially as specified.

4. In a shearing machine, the combination with a frame, comb and vibrating arms, of a vibrator operatively connected with the vibrating arms, a stud upon the vibrator, a revoluble shaft, a driving head thereon, and an eccentric on the driving head loosely connected with the stud, all substantially as and for the purpose specified.

5. In a shearing machine, the combination with a frame and comb, of vibrator arms pivoted thereto and provided with blades a vibrator pivoted to the frame, mechanism for imparting a vibratory motion to the vibrator, and pitmen, terminally pivoted to the vibrator upon the opposite sides of its pivot point and to the vibrator arms respectively, substantially as specified.

6. In a shearing machine, the combination with a frame, comb carried in dove-tail bearings, vibrating arms, shouldered blades carried in dove-tail recesses in the respective arms, a spring, and a bolt passing through the spring and the comb and screwing into the frame, all substantially as and for the purpose specified.

7. In a shearing machine, the combination with a frame and comb, of a plurality of pivoted oscillatory vibrator arms, blades thereon, an oscillatory vibrator pivoted to the frame between the arms, a revoluble shaft carried upon the frame and provided with a driving head, and an eccentric revolubly carried in the driving head and operatively connected to the vibrator, substantially as specified.

8. In a shearing machine, the combination with a frame and comb, of a plurality of pivoted oscillatory vibrator arms, blades thereon, an oscillatory vibrator pivoted to the frame between the arms and operatively connected therewith, a shaft mounted in ball bearings in the frame and provided with a driving head and a stud upon the vibrator loosely connected to said eccentric, substantially as specified.

9. The combination with a frame and vibrator arms of a comb and shouldered blades removably secured to the frame and arms, respectively, by a bolt passing through the frame and comb and a spring secured to the bolt in front of the shoulders of and bearing against the blades, substantially as specified.

In testimony of all which I have hereunto subscribed my name.

SAMUEL FENTON ALLEN.

Witnesses:
SAML. W. ALLEN,
CHARLES A. MCKELVAY.